United States Patent [19]

Lewis

[11] Patent Number: 5,517,430
[45] Date of Patent: May 14, 1996

[54] REAL-TIME DIGITAL ORIENTATION DEVICE

[75] Inventor: W. Stan Lewis, Vista, Calif.

[73] Assignee: Directional Robotics Research, Inc., Fresno, Calif.

[21] Appl. No.: 262,697

[22] Filed: Jun. 20, 1994

[51] Int. Cl.[6] .................................................. G01C 17/26
[52] U.S. Cl. ........................ 364/559; 33/363 K; 33/364; 356/139.09
[58] Field of Search .............................. 33/363 R, 363 K, 33/364; 250/215; 356/139.03, 147, 375; 364/559

[56] References Cited

U.S. PATENT DOCUMENTS

| | | | |
|---|---|---|---|
| 2,662,208 | 12/1953 | Wells | 33/363 R X |
| 3,128,562 | 4/1964 | Yusa | 33/364 |
| 3,438,789 | 2/1969 | Richard | 364/559 |
| 3,501,966 | 3/1970 | Shapiro et al. | 250/215 X |
| 3,515,888 | 6/1970 | Lewis | 356/375 X |
| 4,132,113 | 1/1979 | Lyman, Jr. | 73/178 R |
| 4,146,970 | 4/1979 | Edwards | 33/363 K |
| 4,190,962 | 3/1980 | Lyman, Jr. | 33/363 K |
| 4,341,023 | 7/1982 | Marcus et al. | 33/363 K |
| 4,414,753 | 11/1983 | Moulin et al. | 33/356 |
| 4,416,066 | 11/1983 | Romacker | 33/318 |
| 4,488,431 | 12/1984 | Miga | 33/364 X |
| 4,588,992 | 5/1986 | Clark | 343/10 |
| 4,614,041 | 9/1986 | Darton et al. | 33/313 |
| 4,622,843 | 11/1986 | Hormel | 364/559 X |
| 4,694,584 | 9/1987 | Mills | 33/366 |
| 5,046,011 | 9/1991 | Kakihara et al. | 364/449 |
| 5,090,231 | 2/1992 | Gallagher | 73/1 E |
| 5,107,597 | 4/1992 | Kato | 33/355 R |
| 5,131,154 | 7/1992 | Schierbeek et al. | 33/356 |
| 5,237,872 | 8/1993 | Rademakers | 73/505 |
| 5,297,065 | 3/1994 | Cage et al. | 33/356 X |

Primary Examiner—Edward R. Cosimano
Attorney, Agent, or Firm—Tom Hamill, Jr.

[57] ABSTRACT

A real time directional orientation apparatus is disclosed for use in a four pi ($4\pi$) geometry. The apparatus is to be affixed to an object which translates in space. A source emitter means, which may be radioactive, is suspended in a fluid in concert with a magnet. A bank of emission detectors registers the orientation of the source emitter or emitters against a known starting value. As the object translates in space, so does its position and orientation, thus causing the magnet to adjust its position in reference to an external magnetic field, such as, but not limited to, the earth's magnetic field. The motion of the magnet causes the emitter or emitters orientation to change which is sensed by the emission detectors as both a change in intensity and position. This data is processed by a computer and with ancillary data provided by other sensors provides real time position, path and other navigational, directional and positional data, such as pitch, yaw, attitude and roll.

39 Claims, 8 Drawing Sheets

REAL-TIME DIGITAL ORIENTATION DEVICE

BACKGROUND OF THE INVENTION

This invention relates to the field of navigation devices and more specifically to the field of high resolution directional orientation devices.

A liquid compass typically has a neutrally buoyant magnet assembly, which rotates in a fluid, to provide a directional indication of magnetic north. Such compasses are typically inexpensive, and sold as automobile accessories, or for personal use while hiking, etc.

Also known are compasses which employ a gimbal means to horizontally align a compass card regardless of the orientation of the outer casing. Typically, a gimballed compass utilizes light sensors and an encoded disc to relay positional information electrically through slip-rings. These compasses are expensive, and typically found in marine and aviation navigation apparatus.

U.S. Pat. No. 4,146,970 issuing on Apr. 3, 1979 to Robert Edwards is representative of a remote indicating magnet compass employing an optical shaft encoder responsive to earth's magnetic field.

U.S. Pat. No. 4,416,066 issuing on Nov. 22, 1983 to Bertold Romacker discloses an arrangement for orientation during journeys in land vehicles, which includes a means for ascertaining the distance covered by a vehicle, and a means for ascertaining the changes in direction of the vehicle, to determine the distance covered by the vehicle and/or the current location of the vehicle.

U.S. Pat. No. 4,132,113 issued on Jan. 2, 1979 to Harold Lyman, Jr. discloses a navigation device comprising a magnetic compass, utilizing a compass card having a varying pattern density, a light source, and pairs of sensors responsive to the varying pattern density, and a compensating means for craft pitch and roll.

U.S. Pat. No. 4,614,041 issued on Sep. 30, 1986 to Kenneth Darton discloses a magnetic angular position sensor having a ferrofluid filled spherical chamber in a cylindrical housing, having an odd number of permanent magnets, with Hall effect devices located in recesses in the ends of the cylindrical housing, with a magnetic flux detection means which is responsive to changes in the magnetic flux caused by rotation of the body within the chamber.

U.S. Pat. No. 4,588,992 issued on May 13, 1986 to William Clark discloses a radar tracking system and display comprising a ball type compass having an optical switching circuit for providing azimuth signals indicating the azimuth orientation of the radar unit. An inclinometer having an optical switching circuit for providing a target inclination signal used to determine a target altitude calculation.

U.S. Pat. No. 4,414,753 issuing on Nov. 15, 1983 to Michel Moulin et. al. discloses a process for compensating for the magnetic disturbances for determining a magnetic heading utilizing a computer to define a vector with a reference axis to determine an angle corresponding to the real magnetic heading of the vehicle or aircraft.

These devices all provide for orientation in a plane and provide for no information regarding magnetic inclination or out of plane orientation. Also, these devices do not provide for high linear or angular resolution when a shift in directional orientation occurs. It is the object of the present invention to provide for both inclination and high resolution directional orientation.

Global Positioning Satellites (GPS) provide latitude and longitude with an accuracy tolerance of several meters. The present invention provides precise orientation within the accuracy tolerance of GPS devices. Movement and reorientation of a GPS receiver by a few meters would not be noted by a GPS device since such a small movement is within the accuracy tolerance of the GPS receiver. The invention described herein is sensitive to movement and reorientation of a few millimeters.

SUMMARY OF THE INVENTION

This invention discloses an apparatus for real-time digital directional orientation by incorporating both a digital inclinometer and a digital compass in a spherical housing. The orientation of the compass magnet is sensed, in real-time, while in motion through a full four pi ($4\pi$) steradians.

This invention provides for both micro-orientation, within the error tolerance of the GPS receiver, and, macro-orientation, high resolution dead reckoning with out reference to a GPS receiver. In relation to micro-orientation: This apparatus is capable of determining very precise bearing, inclination and trakcing data relating to robots and other mechanical servo devices, which is well within the accuracy tolerance of a GPS receiver. The real-time directional orientation apparatus disclosed herein, together with associated computer means, will provide a feedback path for moving a robot, or other object from point A to point B, and returning the object by nearly the exact same path, with very high precision. As with any magnetic orientation device the presence of magnetic anomalies will perturb the direction indicated. However, since the invention disclosed is designed to remember an arbitrary motion vector relative to an initial, arbitrary starting point the effects of a constant magnetic anomaly would always be of equal magnitude and opposite direction while retracing a memorized path.

This apparatus can incorporate standard computer visual and vocalization methods to sustain orientation having once traveled a desired path. The invention is to enable the blind to achieve autonomous mobility; to provide navigation assistance for divers or submarines; provide mine field navigation by soldiers or vehicles; provide high resolution tracking and aiming; and provide real-time directional orientation where vision is limited and the distance traveled is within the several meter error tolerance of a GPS receiver based device.

In the field of robotics well known sensors for position determination include optical, infrared, sonar, Doppler shift and contact type sensors. These sensors are used principally as collision avoidance sensors, rather than for inherent guidance along a path. This invention will be used in conjunction with or independently of said sensors and provides advantages over collision avoidance sensors. For example the inability of optical and infrared sensors to discriminate location in smoke filled environments and the interference of hot or cold air with sonar and Doppler shift type sensors. This invention can be used for navigation in smoke-filled environments over a wide range of temperatures with out interference.

In relation to macro-orientation: Likewise, the apparatus is capable of determining the real-time position vector of a vehicle, ship or person relative to a fixed starting point. When used with a GPS receiver device, a very high resolution dead reckoning path between two points may be established. When a path is traveled between two GPS reference points, no difference in continuous path inclination is provided by the GPS receiver. The present invention provides path inclination data, and hence elevation changes may be determined with high accuracy and precision relative to a known starting point. In addition the device is designed to be used as a very high resolution real-time dead reckoning device which operates independently of a GPS receiver. In this application the initial, arbitrary starting point is fixed and all motion is stored relative to this point to allow returning to the starting point or other destination.

Further in relation to macro-orientation: The device can be used for high resolution real-time dead reckoning in conjunction with gyroscopes, magnetic flux valves or other well-known navigation devices. The device can be used independently of said devices once an initial relationship between true north and magnetic north, or the declination, is defined and the path traveled is relatively short. For example, the compass device described here-in points to magnetic north. True north corresponds to a line from the center of the spherical housing to a point on it's surface which also passes through the north pole. This point and the line from the center of the sphere to the point corresponding to magnetic north define an angle which is the declination of the housing. This angle is continuously recalculated as the housing moves and can be determined relative to an ancillary gyroscope or from tables, depending upon the distance traveled relative to known declination changes on the earths surface. In addition it is well known that there are circumstances where GPS receivers are unable to receive true signals, such as when in the presence of tall buildings, mountain valleys, severe weather conditions, solar storms or flares, etc. The invention described will not be affected by such conditions.

In reference to the invention described here-in, the term speed as used in this disclosure is construed to be a scalar quantity, a quantity which has only magnitude. The term directional orientation is also a scalar quantity having only magnitude. When each is measured independently and combined the result is a vector quantity, velocity, which has both magnitude and direction.

The real-time directional orientation apparatus disclosed herein comprises a housing forming a spherical chamber, with a spherical core disposed in spaced relation therein. Fluid extends between the spherical core and the spherical chamber. Coplanar, orthogonal source emitter means having fixed directional orientations are aligned in relation to a magnet within the spherical core. A plurality of source detector means are disposed in horizontally and vertically spaced radial alignment upon the spherical chamber, to receive the directional signals from said source emitter means.

A computer analyzes the signal from the source detector means to determine the relative real-time position and orientation of the outer housing, in relation to some fixed magnetic orientation, such as magnetic north, of the magnet means located within the spherical core.

A speed sensor determines the linear and angular speed of the real time directional orientation apparatus, and data from the source detector means and the speed sensor is used by the computer to determine both the linear and angular velocity the apparatus.

There are two source emitter means which may be disposed in a co-planar fashion at about 90 degrees to each other. The 90 degree angle coplanar disposition being the most sensitive to three dimensional motion.

Therefore, it is an object of the present invention to measure changes in angular direction, incorporate the apparatus speed and determine the resultant instantaneous directional or velocity vector. Said changes are determined and recorded as three dimensional translation, through a full four pi ($4\pi$) steradians, in real time and include motion commonly termed as pitch, yaw, roll and attitude.

It is a further object of the present invention to determine said vectors with a very high resolution, such as a few tenths of a degree, depending upon the size and number of detectors surrounding the coplanar, orthogonal active source emitters.

It is a further object of the invention to provide that the path an object has traveled is retraceable to a with in a few centimeters, and the path traveled resolution being directly proportional to the number of sensors surrounding the emission sources.

It is still a further object of the invention to accomplish dead-reckoning navigation with high accuracy if the initial position is known with high accuracy, or alternatively, with high precision if the initial position is not known with high accuracy.

It is still a further object of the invention to provide for a passive device which is independent of either remote radio broadcast signals or on-board broadcast and measured return signals to accomplish the afore mentioned objectives. The passive device described herein performs these objectives which are accomplished either in conjunction with, or, independently of, electronic navigational aids, such as GPS, gyroscopes, magnetic flux gauges or collision avoidance type sensors (as described generally above).

These together with still other objects of the invention, along with various features of novelty which characterize the invention, are pointed out with particularity in the claims annexed to and forming part of the disclosure. For a better understanding of the invention, its operating advantages and the specific objects obtained by its uses, reference should be made to the accompanying drawings and descriptive matter in which the preferred embodiments of the invention are illustrated.

DESCRIPTION OF THE DRAWINGS

The above mentioned and other features and objects of this invention and the manner of attaining them will become more apparent and the invention itself will be best understood by reference to the following description of the invention taken in conjunction with the accompanying drawings, wherein.

DESCRIPTION OF THE PREFERRED EMBODIMENT OF THE INVENTION

Figure 1:
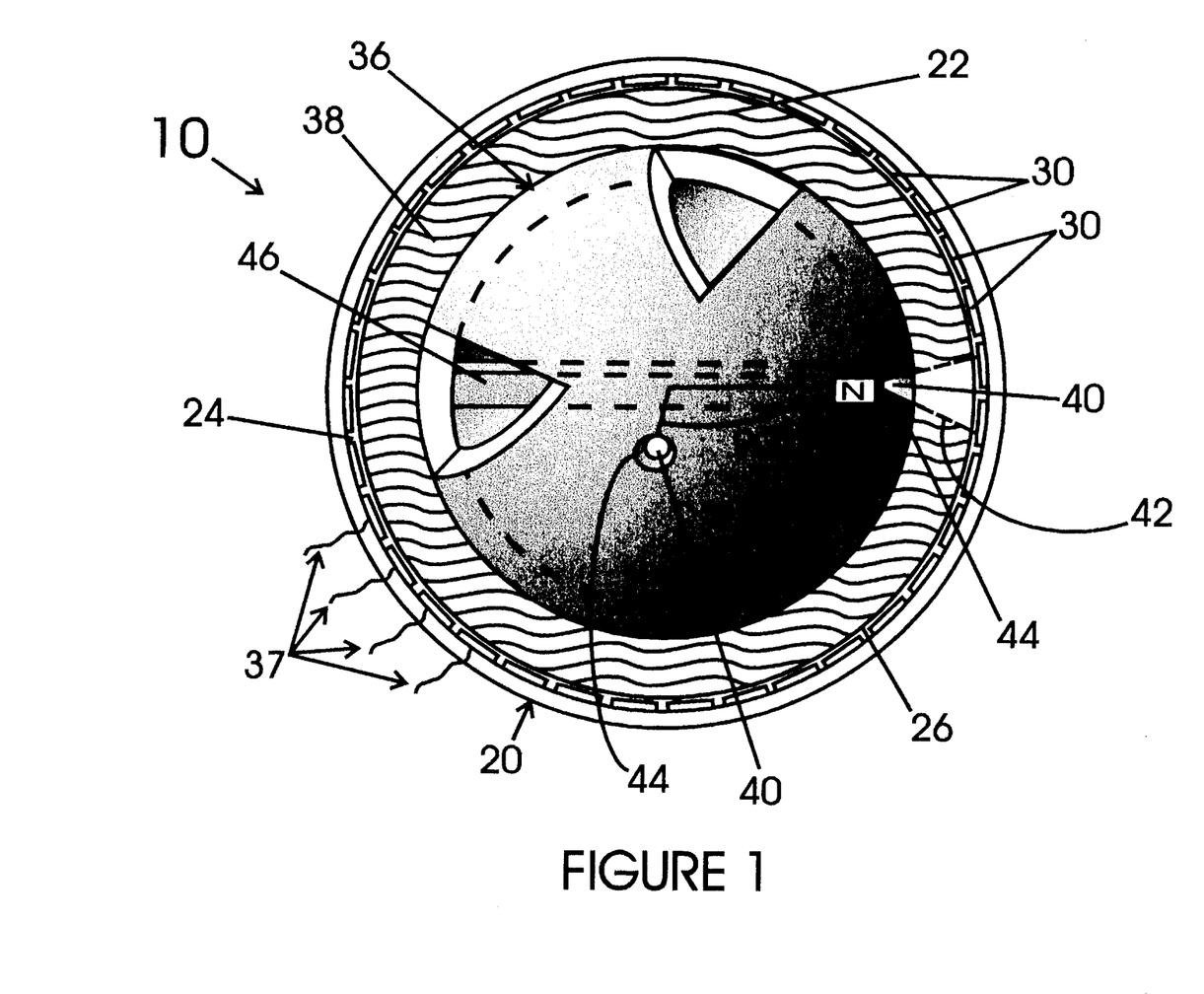
FIG. 1 is a perspective view of the preferred embodiment of the real-time directional orientation apparatus, with a breakaway portion showing the spherical core disposed therein.

As shown in perspective in FIG. 1, the real-time directional orientation apparatus 10 comprises a housing 20 having a spherical chamber 22 disposed therein. The housing 20 may be of any shape, but preferably the housing 20 is spherical in nature, surrounding the spherical chamber 22, in a concentric fashion as shown in FIG. 1.

Figure 2:
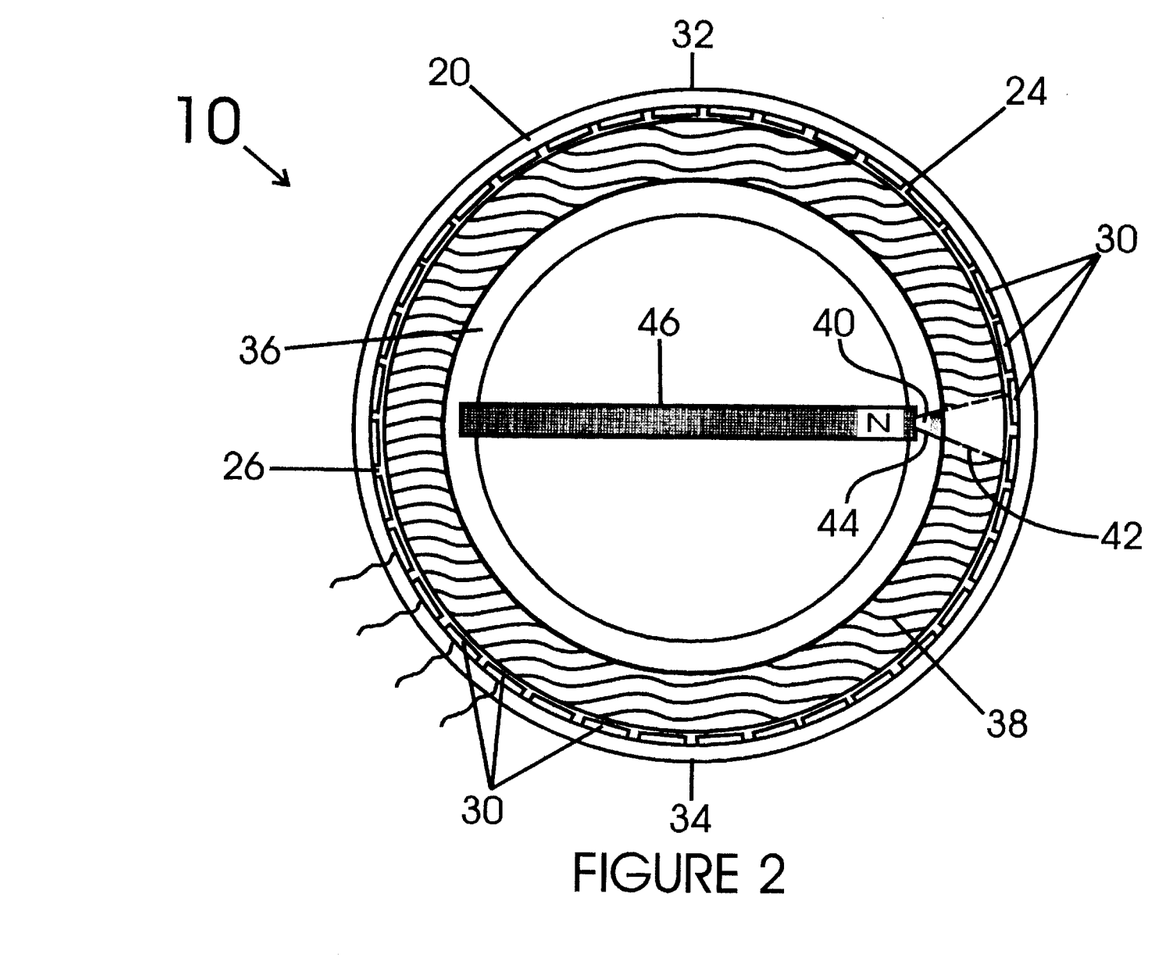
FIG. 2 is a cross sectional view of the preferred embodiment of the real-time directional orientation apparatus shown in FIG. 1.

As best shown in FIG. 2, the inner wall 24 of the housing 20 is preferably lined or otherwise coated with a suitable material 26. The material 26, lining the inner wall 24 of the housing 20, and covering the source detector means 30, is selected to be transparent to the signal from a source emitter means 40 disposed within the spherical core 36. The material 26 lining the inner wall 24 of the spherical chamber 22 prevents the fluid means 38 from making direct contact with the plurality of source detector means 30.

The plurality of source detector means 30 are radially aligned about the spherical chamber 22 in spaced horizontal and vertical alignment between opposing poles 32, 34. The source detector means 30 may be any known source detector means 30, such as subminiature solid state radiation sensors; ionizing radiation detectors; charged particle or particle position detectors; charge coupled devices (CCDs); photon sensitive detectors including, phototransistors, photodiodes, photoresistors; magnetic field detectors including, galvanomagnetic (Hall) sensors, Faraday effect sensors; etc.

In the preferred embodiment of the invention, an ionizing radiation detector will be utilized.

The space between adjacent source detector means 30 may be very small, less than one millimeter, thus providing for orientation resolutions of 500 microns or less.

A spherical core 36 is disposed in spaced relation within the spherical chamber 22. Preferably, the buoyancy of the spherical core is adjusted, to avoid contact with the spherical chamber wall 24, when a fluid means 38 is disposed between the spherical core 36 and the spherical chamber 22. The fluid means 38 preferably completely fills, without void, the inside of the spherical chamber 22. The fluid means 38 is preferably substantially incompressible, providing equal pressure in all directions, to ensure that the spherical core does not forcibly contact the inner wall 24 of the spherical chamber 22.

Disposed within the spherical core 36 is a directional magnet means 46 of sufficient strength to orient the spherical core 36 in relation to a magnetic field, such as, but not limited to, magnetic north on Earth. Where the intended use of the real-time directional orientation apparatus 10 is beyond the influence of Earth's magnetic field, or as applications dictate, another magnetic field may be used.

The magnet means 46 continuously aligns itself with a magnetic field, such as magnetic north, as the housing 12 moves in concert with the apparatus, object or vehicle (not shown) to which it is secured.

A source emitter means 40 is also disposed within the spherical core 36. The source emitter means 40 is aligned in relation to the magnet means 46 to provide two coplanar, orthogonal, known directional orientations of the source emitter means 40 in relation to the magnet means 46.

In the preferred embodiment, the source emitter means 40 is a radioactive source, which decays according to pure electron capture beta decay, such as Iron-55. The Iron-55 is embedded on the surface of the spherical core 36 in two orthogonal, coplanar, locations, each source placed in the center of a source collimator means such as a small depressed cone 44. The two sources are coplanar and are at a known angular displacement from each other. A typical angular displacement from the two sources is 90 degrees which allows for determining maximal translational degrees of freedom of the housing 12. The source collimator means is located on the surface of the spherical core 36 and it's length is less than the thickness (T) of the spherical core 36. The Iron-55 is placed at the center apex of the cone 44.

Figure 3A:
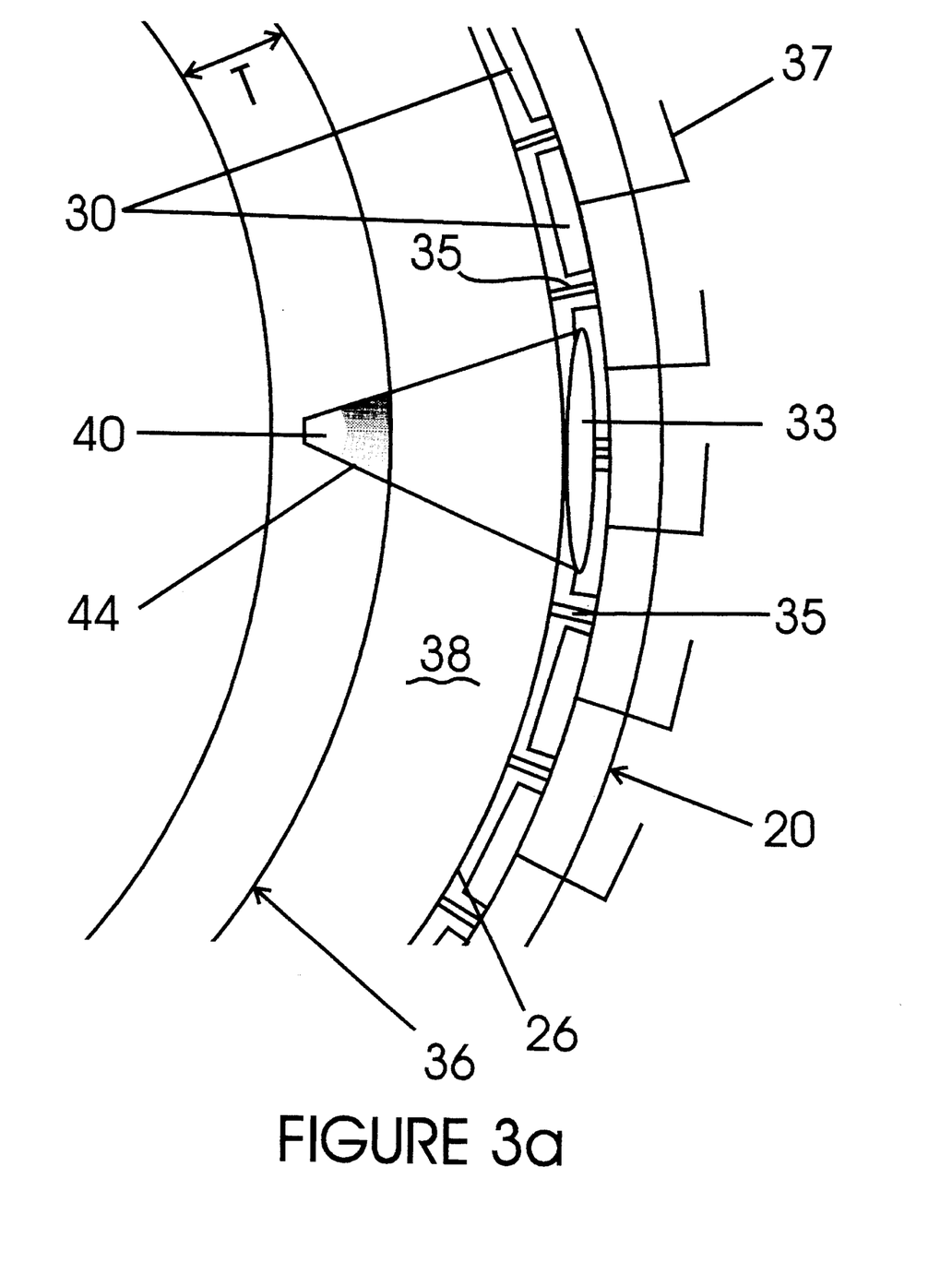
FIG. 3A is a schematic of the geometry of the source emitter and corresponding detectors illuminated by the source emitter.
Figure 3B:
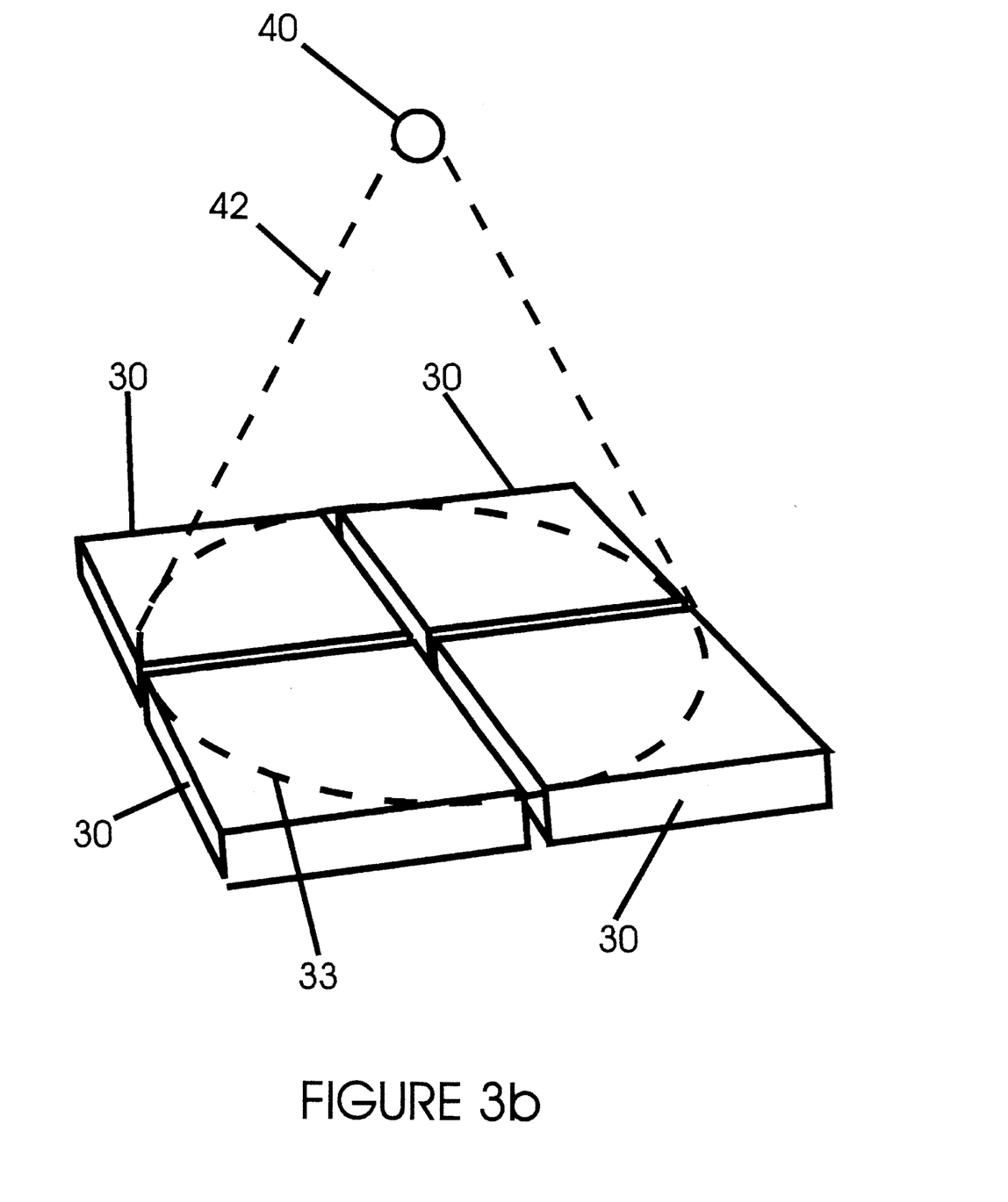
FIG. 3B shows a view of the emission cone from the collimated source describing the relationship between the detector area and the area of the projected emission cone.

Referring now specifically to 3A and 3B the emitter means 40 projects a stream of conically collimated radiation 42. The conically collimated radiation 42 strikes the inner spherical housing surface leaving a circular projection 33 on the inner spherical housing surface. The circular projection 33 has an area A(S). The circular projection 33 is detected by source detector means 30. The source detector means 30 have a sensitive area A(D). The circular projected area A(S) is approximately twice that of the source detector means sensitive area A(D). Wires 37 communicate with signal processing apparatus and computers to indicate the source detector means on-off status and the intensity of the emission received. The space 35 between the source detector means is not sensitive to ionizing radiation and separates the source detector means by a known distance. FIG. 3A illustrates the emission or illumination cone from the collimated source and the preferred relative size relationship between the collimated source and the detectors disposed about the housing.

The FIG. 3B illustration is used to further indicate the source/detector geometry. As depicted in FIG. 3B the centroid of the illumination cone from the emission source is the geometric center of the four detectors shown. Said centroid is thus the direction indicated by the emission illumination and corresponds to a virtual point on the spherical housing. Said illumination striking the detectors has an area of approximately twice the sensitive area of said detectors.

As the object moves in space the magnet means 46 aligns itself with some external magnetic field, such as the earth's magnetic field. This in turn causes the two cones of emitted soft x-rays to change orientation, thus causing different radiation detectors to be illuminated by the soft x-rays, some fully, others partially. The intensity of the radiation received coupled with the location of the radiation detectors stimulated generate a signal corresponding to the orientation of the magnetic means, 46. Said signal is combined with the information received by the speed indicator and other ancillary information and is then processed by the computer. Through signal processing and computer calculations, the matrix of intensity values on the individual detectors, coupled with the location of the detectors which are stimulated and the speed information may be integrated and used to generate a directional or velocity vector. It is important to be clear that this gives three dimensional translational data, as the buoyant sphere in which the magnet resides may rotate both up and down as well as left and right as it is suspended in the incompressible fluid means.

Iron-55 is the preferred radioactive material as it has an appropriate half life and undergoes a specific decay process which lends itself to be utilized in the instant embodiment. The half life of Iron-55 is reported to be 2.6 years and is well known to decay by pure electron capture beta decay with associated low energy internal Bremsstrahlung continuous radiation. The emitted x-rays are approximately 4.9 Kev corresponding to those of the stable daughter Manganese-55.

Low energy x-rays, such as those emitted during the decay of Iron-55, are easy to attenuate, such that little residual radiation would escape the housing 12. The radiation would approximate the radiation used in home smoke detectors. An embodiment employing higher energy radiation is not desirable due to the unattenuated residual radiation escaping from the housing, and the difficulty of collimation of high energy radiation sources.

Low energy X-rays from the source emitter means 40 strike a plurality of discrete source detector means 30, such as radiation detectors, including, but not limited to, ionizing radiation detectors, to provide real-time directional orientation data regarding the relationship between the source emitter means 40 and the source detector means 30. The source emitter means 40 preferably projects conically collimated radiation 42. The conically collimated radiation 42, strikes the inner spherical housing surface leaving a circular projection 33 on the inner spherical housing surface. The circular projection 33 has a diameter of approximately twice the area of the detector sensitive area; with detectors being placed such that the distance between the adjacent centroids of the sensitive areas are approximately one-half the distance between the detector boundaries. This is best shown in FIG. 3B.

The resolution of the source emitter means 40 signal 42 is dependent upon the minimum change in signal intensity sensed by the source detector means 30. This resolution of the source emitter means signal 42 is related to the detector dark current and is a function of the type of source detector means 30 selected.

Figure 4:
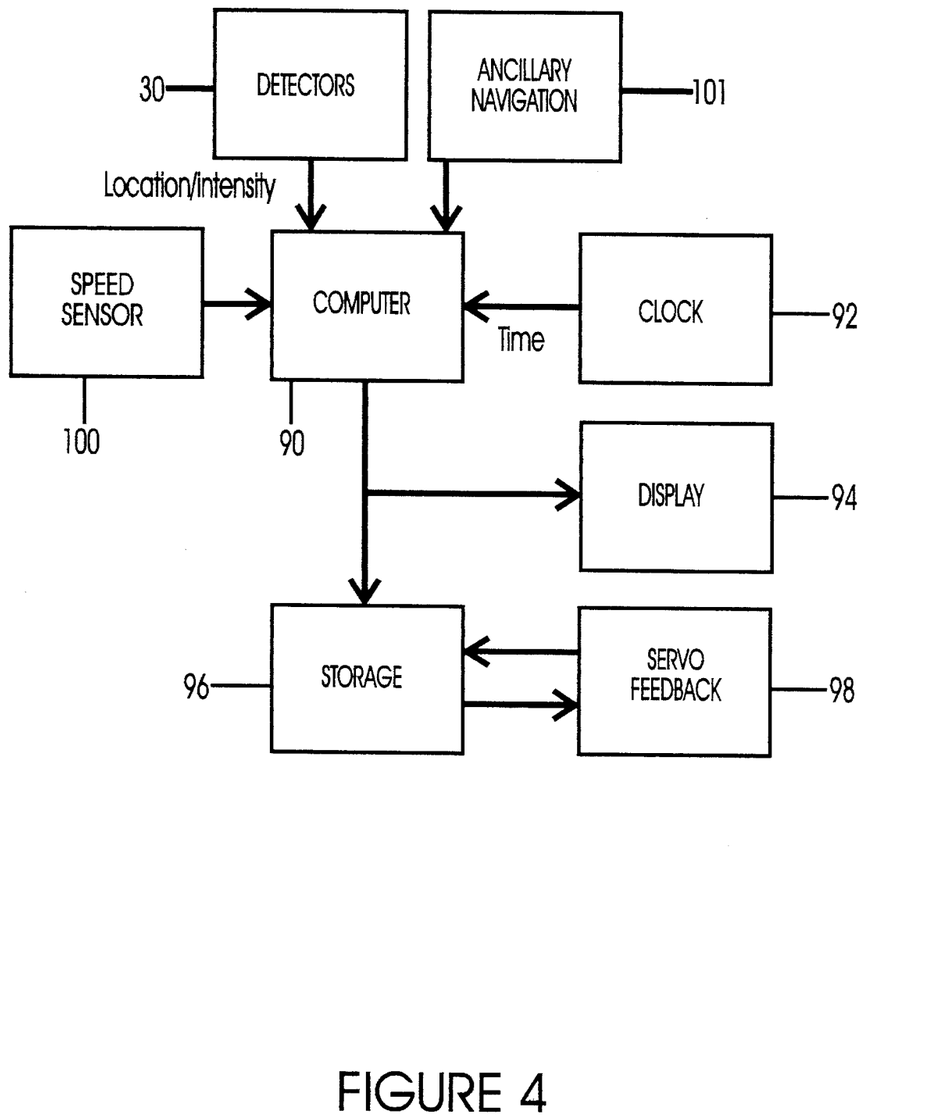
FIG. 4 is a diagram showing the relationship between logical components utilized in the preferred embodiment of the real-time directional orientation apparatus.

Referring now to FIG. 4, each source detector means 30 is preferably independently polled by a computer 90, using a priori information from the previous polling sample. For example, the computer 90 need not poll all detectors sequentially. Rather, the source detector means 30 preferably preferentially polls the source detector means 30 nearest to the previous signal received from the source emitter means 40.

The emission generated by the source emitter means 40, is detected by the source detector means 30, which in turn generates an electrical signal which is processed by a computer means 90, which notes the duration, location and intensity of the signal from the source emitter means 40. For purposes of this disclosure, computer means 90 is intended to include both computer hardware and software, as known in the art.

A separate speed sensor means 100 is used to determine the linear and angular speed of the directional orientation apparatus 10. Speed sensor means 100 for various moving bodies constitute well known technology, known to one of skill in this art, and thus are not further detailed herein.

The combination of scalar speed from speed sensor means 90, scalar location/intensity data from detector means 20 are integrated by the computer means 90 to provide a real-time orientation vector useful for obtaining navigation information relating to the directional orientation apparatus 10, and the object or apparatus to which it is secured or attached. For purposes of this disclosure, the object or apparatus to which it is secured may be a robot, vehicle, boat, satellite, aircraft, missile, individual, or other known moving body.

The data from the computer means 90 may be processed using known or standard software and logic, for display on a multi dimensional display. The data may also be stored in a storage device 96 in order to be utilized at a later date. Calculated position data may be displayed on appropriate multi dimensional display devices 94. A clock 92 will generate the appropriate time and frequency flags to assist the computer 90 in position data generation in real time. Feedback 98 from the device will enable a change in course or position to be implemented by a decision making protocol which bi-directionally addresses a servo-mechanism.

In such a manner, dead reckoning navigation may be realized, as well as the generation of very high resolution directional vectors. Through utilization of the instant invention, one will be able to retrace the path an object has travelled with a high degree of precision.

Computer 90 also receives information from ancillary navigation devices 101, as dictated by the application. Such devices include, but are not limited to; gyroscopes, magnetic flux valves, GPS receivers, etc.

OPERATION OF THE PREFERRED EMBODIMENT OF THE INVENTION

The source emitter means 40 is aligned with the north pole of the magnet means 46, and collimated by the first and second source collimator means, cones 44, so that the centroid of illumination corresponds, in any equatorial plane, to the centroid of the magnet. As the spherical chamber 22 moves in concert with the object to which the housing 12 is secured, the magnet means 46 and the source emitter means 40 maintain an orientation with an external magnetic field, or magnetic north. Each source detector means 30 location on the spherical chamber 22 has a unique location one of which then corresponds to magnetic north (or other applied magnetic field). This source detector means 30 location and all points between source detector means 30 correspond to virtual reference points on the spherical chamber 22, each of which is a unique direction relative to both true north and magnetic north. The virtual points between the source detector means 30 are calculated by interpolation of the relative intensity of each source detector means 30. Source detector intensities are determined relative to the source detector means 30 having the highest intensity.

The collimated source emitter means 40 is specified to illuminate an area approximately twice that of the active area of the source detector means 30. When the centroid of the source emitter means 40 is aligned directly on the center of one of the source detector means 30, then the location of this source detector means is aligned with the magnetic north field or other external magnetic field, since the adjacent source detector means each receive the same relative fraction of the source emitter means intensity. This information constitutes an intensity matrix whose centroid corresponds to the direction of the magnet means 46, which, in this case would be the center of the source detector means.

When a displacement of the object or apparatus to which it is secured occurs, when the magnet means 46 oscillates, seeking a new equilibrium position in relation to the magnetic field orientation. A new intensity balance is calculated by the computer means 90 by sampling the source detector means 30 and sensing a change in both absolute and relative illumination intensities. The new maximum intensity location can be determined as long as the sampling and calculation rate is significantly greater than the rate of displacement of the source emitter means 40 and the magnet means 46.

A typical sampling rate, using available analog to digital converters is in the kilohertz range, much faster than the source emitter means 40 and the magnet means 46 are likely to change directions. Since the oscillation of the spherical core 36 is dampened by the fluid, the oscillation frequency is harmonic, and can be determined by evaluating the illumination intensity of the source detector means 30 during the first few oscillations.

Signal averaging from the illuminated source detector means 30, allows a new virtual orientation to be calculated and stored and/or displayed every few milliseconds. Sampling rates in the megahertz range and calculations in the microsecond range are also realistic using currently available technology.

The new intensity matrix is determined relative to the source detector means 30 which receives the highest intensity illumination. A new virtual location of the magnet directional orientation is calculated and that position is representative of magnetic north or as alignment with an external magnetic field. All virtual positions of the source detector means 30 and the object which is secured to the housing 12 are shifted by the same amount.

The results of these calculations provide a scalar direction. A speed sensor means 100 provides output in relation to the scalar direction. As the scalars, speed and direction, are continuously updated by the computer means 90, the distance and direction traveled between detector means 30 sequential illuminations can be determined. The net result is real-time path traveled vector from a known starting point.

Discussion of Other Embodiments of the Invention

Figure 5:
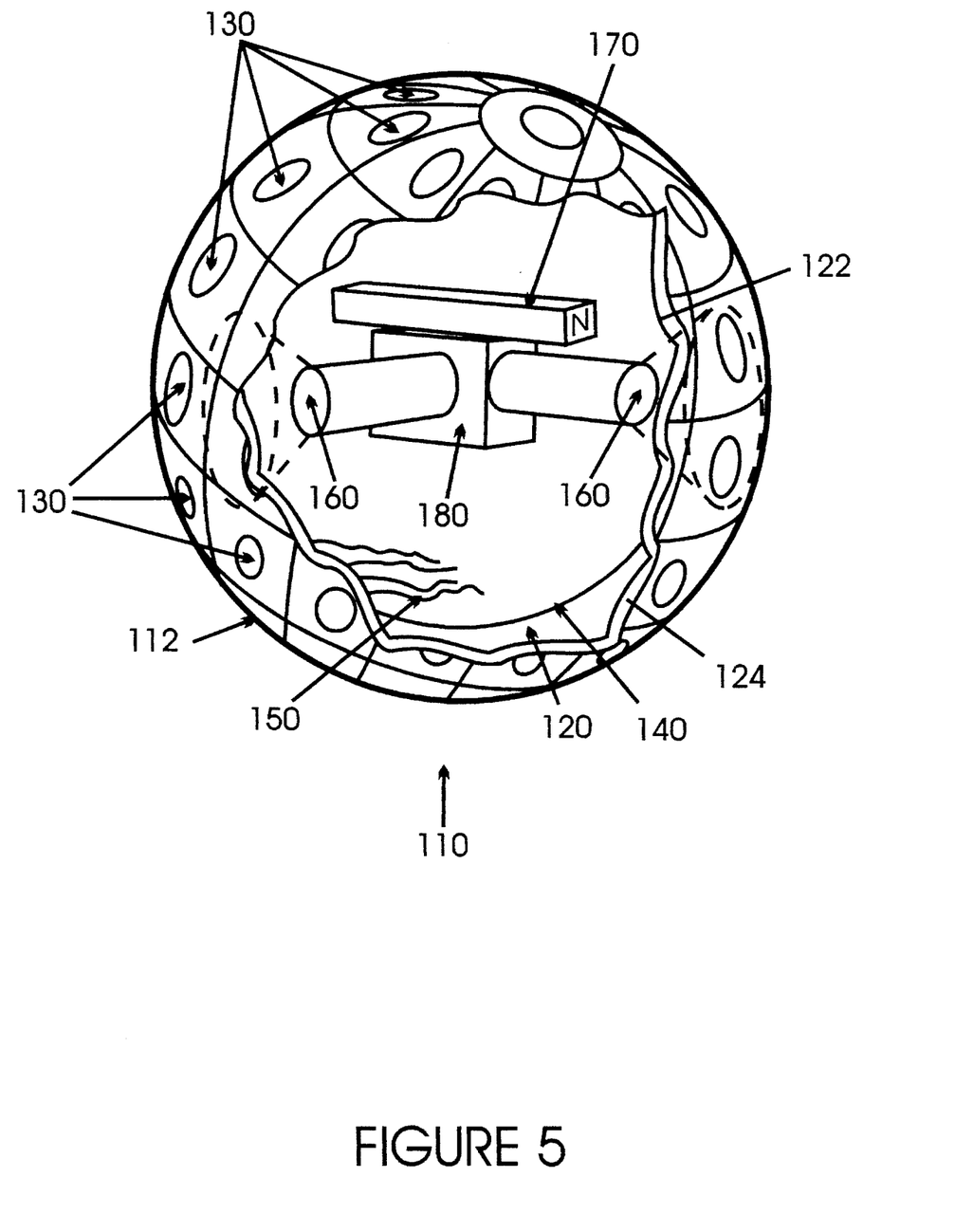
FIG. 5 is a perspective view of an embodiment of the real time directional orientation apparatus showing orthogonal coplanar emission sources and associated power supply required for certain types of emission sources.

Other possible configurations and embodiments are possible. These modifications demonstrate the use of different emitters other than the aforementioned Iron-55. As shown in perspective in FIG. 5, the real-time directional orientation apparatus 110 comprises a housing 112 having a spherical chamber 120 disposed therein. The housing 112 may be of any shape, but preferably is a spherical housing 114 surrounding the spherical chamber 120, as shown in FIG. 5.

Figure 7:
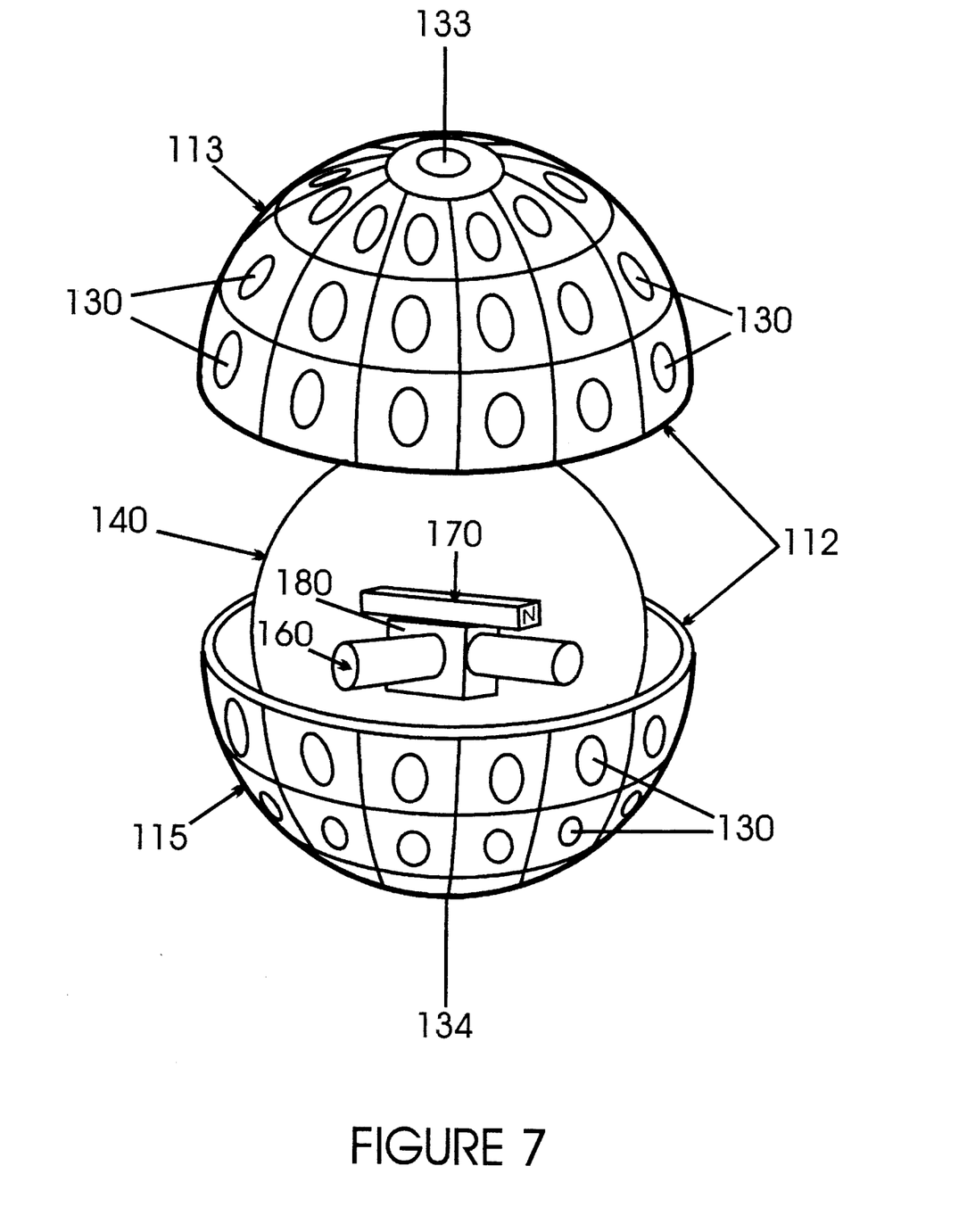
FIG. 7 is a view of FIG. 5, showing the separation of the housing for access to the spherical core.

As shown in FIG. 7, the housing 112 is preferably bifurcated into two parts 113 and 115 to provide access to the spherical core 140 located within the spherical chamber 120.

Figure 6:
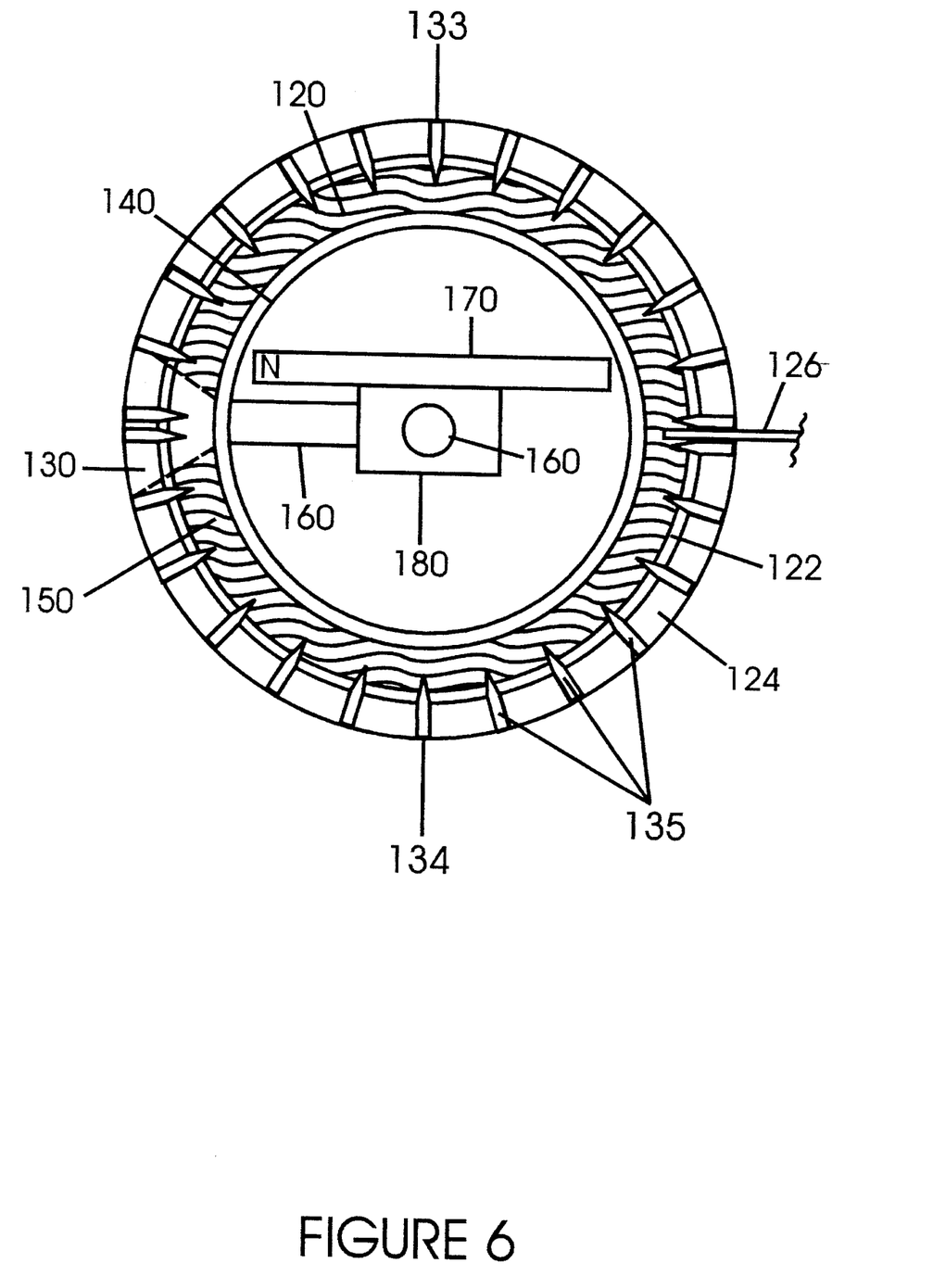
FIG. 6 is a cross-sectional view of FIG. 5 of the real time directional orientation apparatus showing heat transfer elements and electric charge dissipation means.

As best shown in FIG. 6, the inner wall 122 of the spherical chamber 120 is preferably lined or otherwise coated with a suitable material 124. The material 124 lining the inner wall 122, is preferably transparent to the signal from a source emitter means 160 disposed within the spherical core 140. The material 124 lining the inner wall 122 of the spherical chamber 120 prevents the fluid means 150 from making direct contact with the plurality of source detector means 130.

The plurality of source detector means 130 are radially aligned about the spherical chamber 120 in spaced horizontal and vertical alignment between opposing poles 133, 134.

The source detector means 130 may be any known source detector means 130, such as subminiature solid state radiation sensors; ionizing radiation detectors; charged particle or particle position detectors; charge coupled devices (CCDs); photon sensitive detectors including, phototransistors, photodiodes, photoresistors; magnetic field detectors including, galvanomagnetic (Hall) sensors, Faraday effect sensors; etc.

The source emitter means 160 may be any known source emitter means 160 compatible with the selected source detector means 130. For instance, the source emitter means 160 may be the magnet means 170, and the source detector means 130 is a plurality of Hall effect sensors, or Faraday type sensors located about the spherical chamber 120. This type of sensor is sensitive to the magnetic field of each end of the magnet forming the compass, and provide real-time orientation of the compass magnet by returning a change in current flow when aligned with the magnet means 170. Circuitry which allows for rapid sensing and current discharge is well known in this art, and thus is not further detailed herein.

The source emitter means 160 may be a solid state light emitting diode, or other photon or charged article source, such as an aggregation of photoluminescent molecules, gamma or x-ray source, alpha or beta particle emitter, or a combination thereof.

Electromagnetic radiation, such as ultraviolet, visible and infrared radiation will also provide a satisfactory source emitting means 160. The source of electromagnetic radiation may be an aggregate of luminescent molecules which are charged using higher energy radiation than they emit. Said charging can take place through a hole in the top of the sphere, which is aligned with a hole in the top of the spherical core 140, through which charging radiation is allowed to pass at intervals. No ground wire or heat dissipation means would be required when using such a configuration.

Where the source emitter means 160 is the type requiring an internal power source, such as a LED (Light Emitting Diode), a suitable power source 180 may be secured within the spherical core 140, in electrical communication with the selected source emitter means 160. This allows the spherical core 140 to freely rotate within the fluid means 150 in the spherical chamber 120. The power source 180 may be a battery or a capacitor (not shown). The power source may be connected to a circuit means to pulse the emitted source emitter means to prolong the life of the power source 180.

In another embodiment, the source emitter means 160 is a sealed radioactive source, such as an alpha or beta emitter, embedded within the spherical core 140. A radioactive source selected for the source emitter means 160 may be selected from tritium or nickel-63. If these radioactive materials are utilized, an electrical charge will be generated, as the materials decay, on the spherical core 140. A ground wire 126 will be employed to dissipate this charge. Where the source emitter means 160 is a radioactive source, the spherical core 140 is preferably grounded to prevent a charge build-up on the spherical core 140, except in the instance where Iron-55 is utilized as the radioactive source.

Fluid means 150 is preferably a liquid electrolyte solution. Where the fluid means 150 is selected to be an electrolyte solution, a ground wire 126 preferably extends through the inner wall 122 of the spherical chamber into contact with the fluid means 150. The electrolyte fluid solution means 150 and the ground wire 126 serve to prevent a charge build-up on the spherical core 140. The ground wire 126 preferably extends through the bifurcated portion of the housing, or is inserted means 130. "Heat dissipation means 135 are shown in FIG. 6 and may be utilized in some applications." through the housing 112 wall 122 between the source detector Thus, while the real-time directional orientation apparatus has been fully described and disclosed, numerous modifications will become apparent to one of ordinary skill in this art, and such adaptations and modifications are intended to be included within the scope of the following claims.

What is claimed is:

1. A real-time directional orientation apparatus, for determining the directional orientation of an object, comprising:
   a) a housing having an inner wall forming a spherical chamber, the spherical chamber having opposing poles disposed within an outer housing;
   b) a spherical core disposed in spaced relation within the spherical chamber;
   c) a fluid means disposed between the spherical core and the spherical chamber;
   d) a source emitter means having a directional orientation disposed within the spherical core, the source emitter means providing a directional signal of sufficient strength to pass through the fluid means; and
   e) a plurality of source detector means disposed in horizontally and vertically spaced, radial alignment between the opposing poles on the inner wall of the outer housing, the source detector means positioned to receive the directional signal from the source emitter means, and to transmit data from the source detector means regarding the relative intensity of the signal received from the source emitter means;
   f) a magnet means disposed within the spherical core, the magnet means having a directional orientation relative to magnetic north or other external fixed magnetic field, the directional orientation of the magnet means being in fixed relation to the directional orientation of the source emitter means; whereby
   the relative intensity of the signal from the source emitter means is sensed by at least one of the plurality of source detector means, to determine the relative real time position and orientation of the housing, in relation to the magnetic north orientation of the magnet means located within the spherical core.

2. The apparatus of claim 1, wherein a portion of the housing is separable, to provide for the selective removal and insertion of the spherical core within the housing, for ease of maintenance and repair.

3. The apparatus of claim 1, wherein data from the source detector means is analyzed by a computer every few milliseconds by means of signal averaging, to determine the real-time directional orientation of the apparatus.

4. The apparatus of claim 1, wherein a scalar orientation resolution of the directional source emitter means is less than the distance between adjacent source detector means.

5. The apparatus of claim 1, wherein two sources are positioned in a co-planar fashion at 90 degrees from each other such that illumination of the source detectors occurs from the surface of the spherical core.

6. The apparatus of claim 1, wherein data from a speed sensor is integrated by a computer with a scalar direction determined by the real-time directional orientation apparatus to provide real-time location and path traveled vectors from a known starting point.

7. The apparatus of claim 1, wherein the source emitter means is a radioactive source, and the source detector means is a radiation detector.

8. The apparatus of claim 7 wherein the radioactive source is iron-55.

9. The apparatus of claim 1, wherein a selected sampling rate of a relative intensity signal from the source detector means, is greater than a relative movement rate of the source emitter means.

10. The apparatus of claim 9, wherein the selected sampling rate of the relative intensity signal from the source detector means is measured in the kilohertz range.

11. The apparatus of claim 1, wherein a speed sensor is secured to the housing to determine the linear and angular speed of the real time directional orientation apparatus.

12. The apparatus of claim 11, wherein a computer samples a plurality of data signals from the source detector means and the speed sensor, to determine both the linear and angular speed of the apparatus, to determine a real-time orientation vector.

13. The apparatus of claim 11, wherein a computer receives a plurality of real-time data samples from the source detector means, and preferentially analyzes data showing the highest relative intensity of the data signal from the last real-time data signal received, to preferentially sample those source detector means located nearest to the highest relative intensity of the last data signal, at a sampling speed sufficient to determine the real-time position and orientation of the outer housing in relation to the magnetic north orientation of the magnet means located within the spherical core.

14. A real-time directional orientation apparatus, for determining the directional orientation of an object, comprising:
   a) a housing having an inner wall forming a spherical chamber, the spherical chamber having opposing poles disposed within the housing, the housing separable to provide for access to the spherical chamber;
   b) a spherical core disposed in spaced relation within the spherical chamber;
   c) a fluid means disposed between the spherical core and spherical chamber;
   d) a source emitter means having a directional orientation disposed within the spherical core, the source emitter means providing a directional signal of sufficient strength to pass through the fluid means;
   e) a power supply means disposed within the spherical core, to power the source emitter means;
   f) a plurality of source detector means disposed in horizontally and vertically spaced radial alignment between the opposing poles on the inner wall of the housing; the source detector means positioned to receive the directional signal from the source emitter means, and to transmit data from the source detector means regarding the relative intensity of the signal received from the source emitter means; and
   g) a magnet means disposed within the spherical core, the magnet means having a directional orientation relative to magnetic north, the directional orientation of the magnet means being in fixed relation to the directional orientation of the source emitter means; whereby
   the relative intensity of the signal from the source emitter means is sensed by at least one of the source detector means, to determine the relative real time position and orientation of the outer housing, in relation to the magnetic north orientation of the magnet means located within the spherical core.

15. The apparatus of claim 14, wherein a selected sampling rate of the relative intensity signal from the source detector means is greater than a relative movement rate of the source emitter means.

16. The apparatus of claim 14, wherein data from the source detector means is analyzed by a computer every few milliseconds by means of signal averaging, to determine the real-time directional orientation of the apparatus.

17. The apparatus of claim 14, wherein a speed sensor is secured to the housing, and data from the speed sensor and data from the source detector means is analyzed by the computer, to determine the linear and angular speed of the real time directional orientation apparatus, and to determine a real-time orientation vector therefrom.

18. The apparatus of claim 14, wherein a scalar orientation resolution of the directional source emitter means is less than the distance between adjacent source detector means.

19. The apparatus of claim 14, wherein the fluid means is an electrolyte, and the housing is grounded to prevent an electrical charge build-up on the spherical core.

20. The apparatus of claim 14, wherein data from a speed sensor is integrated by a computer with a scalar direction determined by the real-time directional orientation apparatus to provide real-time location and path traveled from a known starting point.

21. The apparatus of claim 14, wherein the source emitter means is a directional magnet means, and each of the plurality of source detective means is selected from one of a Hall effect sensor and a Faraday type sensor.

22. The apparatus of claim 14, wherein the source emitter means is a radioactive source, and the source detector means is a radiation detector.

23. The apparatus of claim 14, wherein the source emitter means is a light emitting diode, and the source detecting means is a plurality of photon sensitive detectors.

24. The apparatus of claim 23, including heat dissipation means for dissipating heat build up within the apparatus.

25. The apparatus of claim 14, wherein the fluid means is an electrolyte, and the inner wall of the housing is grounded to prevent an electrical charge build-up on the spherical core.

26. The apparatus of claim 25, wherein the source emitter means is radioactive and the source detection means is a radioactive detector.

27. The apparatus of claim 26, wherein the radioactive source is selected from one of Tritium and Nickel-63.

28. A real-time directional orientation apparatus, comprising:
  a) a housing having an inner wall forming a cylindrical chamber;
  b) a spherical core disposed in spaced relation within the spherical chamber;
  c) a fluid means disposed between the spherical core and the spherical chamber;
  d) a source emitter means having a directional orientation disposed within the spherical core, the source emitter means providing a directional signal of sufficient strength to pass through the fluid means;
  e) a plurality of source detector means radially aligned in spaced relation in a plurality of horizontal and vertical rows upon the cylindrical chamber, the source detector means positioned to receive the directional signal from the source emitter means;
  f) a magnet means disposed within the spherical core, the magnet means having a directional orientation relative to magnetic north, the directional orientation of the magnet means in fixed relation to the directional orientation of the source emitter means;
  g) a pair of source collimator means aligned co-planar and at a 90 degree relation upon the spherical core;
  h) a speed sensor means; and
  i) a computer means in communication with the source detector means, and the speed sensor means, to selectively determine real-time position and orientation of the housing, to determine the linear and angular speed of the apparatus, to determine a real-time orientation vector, to aid in determination of pitch, yaw, attitude and roll; and to determine real-time location and path traveled vectors from a known starting point.

29. The apparatus of claim 28, wherein the source emitter means is a radioactive source, and the source detector means is an ionizing radiation detector.

30. The apparatus of claim 28, wherein the source emitter means is a light emitting diode, and the source detecting means is a plurality of photon sensitive detectors.

31. The apparatus of claim 28, wherein the source emitter means is the magnet means, and the source detective means is selected from one of a Hall effect sensor and a Faraday type sensor.

32. The apparatus of claim 28, wherein the scalar orientation resolution of the source emitter means is less than the distance between adjacent source detector means.

33. The apparatus of claim 28, wherein the source emitter means is an aggregate of luminescent material.

34. The apparatus of claim 33, wherein the spherical core has a first opening.

35. The apparatus of claim 34, wherein the spherical chamber has a second opening.

36. The apparatus of claim 35, wherein said first opening and said second opening are proximal and said second opening resides above said first opening is such a fashion as to permit electromagnetic radiation to traverse to illuminate the source emitter means.

37. A real-time directional orientation apparatus, for determining the directional orientation of an object, comprising:
  a) a housing having a wall forming a chamber,
  b) a core disposed in spaced relation within the chamber;
  c) a fluid means disposed between the core and the chamber;
  d) a source emitter means having a directional orientation disposed within the core, the source emitter means providing a directional signal of sufficient strength to pass through the fluid means;
  e) a plurality of source detector means disposed on the housing, the source detector means positioned to receive the signal from the source emitter means, and to transmit data from the source detector means regarding the signal received from the source emitter means; and
  f) a magnet means disposed within the core, the magnet means having a directional orientation relative to an external fixed magnetic field, the directional orientation of the magnet means being in fixed relation to the directional orientation of the source emitter means; whereby
  the signal from the source emitter means is sensed by at least one of the plurality of source detector means, which is utilized to determine the relative real time position and orientation of the housing, in relation to the external fixed magnetic field.

38. The apparatus of claim 37, wherein the source emitter means is a radioactive source, and the source detector means is a radiation detector.

39. The apparatus of claim 38 wherein the radioactive source is iron-55.

* * * * *